United States Patent [19]

Meier et al.

[11] 4,025,837

[45] May 24, 1977

[54] ADAPTIVE CONTROL CIRCUIT FOR A STEPPING MOTOR

[75] Inventors: Johann Hans Meier, Vestal; Jerry Wesley Raider, Endicott, both of N.Y.

[73] Assignee: International Business Machines Corporation, Armonk, N.Y.

[22] Filed: June 30, 1975

[21] Appl. No.: 591,810

[52] U.S. Cl. .............................. 318/561; 318/685
[51] Int. Cl.² ........................................ G05B 13/00
[58] Field of Search .......... 318/561, 685, 676, 632; 235/151.11

[56] References Cited

UNITED STATES PATENTS

| | | | |
|---|---|---|---|
| 3,482,155 | 12/1969 | Fredriksen | 318/561 |
| 3,629,560 | 12/1971 | Slawson | 235/151.11 |
| 3,748,563 | 7/1973 | Pomella et al. | 318/573 |
| 3,789,971 | 2/1974 | Deyesso et al. | 318/685 X |
| 3,813,592 | 5/1974 | Ryberg | 318/696 |
| 3,950,685 | 4/1976 | Kramer | 318/561 |

Primary Examiner—Robert K. Schaefer
Assistant Examiner—John J. Feldhaus
Attorney, Agent, or Firm—Kenneth P. Johnson

[57] ABSTRACT

Adaptive control circuit for a stepping motor in which each motor displacement from a present position to a target position is monitored and the proportion of acceleration signals to deceleration signals is modified as necessary to obtain minimal elapsed time during motor movement. Each designated motor displacement is assigned a corresponding number of acceleration signals which are applied to move the motor. Then during a subsequent homing of the motor, the motor displacement is monitored and the number of acceleration signals previously applied is either altered or left unchanged as a result of comparison between this displacement and a standard. The adaptive control circuit is shown as applied to printing apparatus in which a print disk is variously rotated by a first stepping motor mounted on a carrier and the carrier is moved along a print line by a second stepping motor.

10 Claims, 6 Drawing Figures

ADAPTIVE CONTROL CIRCUIT FOR A STEPPING MOTOR

BACKGROUND OF THE INVENTION

In many stepping motor application the objective is to move an inertia load such as a print disk accurately from one position to another in a minimum of time. Such applications usually require a velocity profile having a much acceleration as possible that is compatible with the shortest low-speed homing time and yet allow the motor to be dentented at the desired position. In other words, overshoot or undershoot of the targe position is to be avoided.

Whereas in many printers, the disk is rotating while printing, in a start-stop disk priner designed for a high print rate, the disk is rotated to a new position and brought to rest between hammer firings. In moving the disk to select the desired character, the number of increments necessary for moving the disk to the target position is calculated for the motor and these data in turn determine the number of acceleration signals to be applied to control the motor. The control data are usually maintained in a storage device from which the appropriate values are extracted. With this control technique, the stored data are frequently not optimized because of variable operating conditons or motor characteristics. For example, the power supply voltage, ambient temperature, or mechanical friction may either vary during operation or from one mechanism to another. Fixed numbers of acceleration, deceleration of stop signals for motor control then become causes for inefficient operation. When fixed values are stored, frequently changes are not easily made in the data and a service call or extensive time is required to alter the control data.

It is accordingly a primary object of this invention to provide a control system for stepping motors in which control data can be altered in accordance with the actual operating conditions encountered.

A further object of this invention is to provide apparatus to move a stepping motor as rapidly as possible from an initial position to a target position while considering prevailing extraneous conditions.

Yet another object of this invention is to provide a stepping motor control circuit that changes the proportion of acceleration steps to total steps according to actual operating conditions.

A still further object of this invention is to provide a stepping motor control system in which the homing distance is used to determine the number of acceleration signals applied to the motor during a future stepping sequence.

A still further object of this invention is to provide a stepping motor control circuit in which the number of acceleration signals for a stepping sequence are recalled from a storage device and then modified or left unchanged for subsequent sequences as a result of actual performance.

SUMMARY OF THE INVENTION

The foregoing objects are attained in accordance with the invention by providing a storage means having stored therein data representing a specified number of acceleration steps required of the stepping motor for each total number of steps in which the motor is commanded to move from a present position to a target position, using correction means to add to the specified number of acceleration steps a correction which reflects past performance of the motor to obtain a total of the number of acceleration steps to be applied to the motor, and accelerating the motor over this total of steps. After allowing the motor to decelerate to a predetermined speed, and monitoring the distance tranversed at this low speed to reach the target, the number of correction acceleration steps originally added is modified if this distance was too great or too small.

The storage means for the base number of acceleration steps and correction number of accleration steps are searched upon the issuance of a move command to the motor. Motor deceleration occurs after the specified total number of acceleration signals have been applied and, during this time, feedback signals corresponding to the advance steps of the motor are monitored as to elapsed time between feedback signals and the time value is compared with a predetermined limit. The deceleration mode of the motor is terminated when this time value exceeds the limit and then the motor moves at a low, constant speed toward the target position. Finally, the motor is placed in a stop mode so that it comes to rest at the specified location without over or undershooting the target position. During the constant-speed mode, the count of feedback signals from the motor is compared with predetermined limits. If the count is outside a specified norm, then the storage means containing the acceleration correction factor is altered.

This control system has the advantage of applying to each motor movement the maximum number of acceleration steps compatible with the required deceleration and stopping of the motor. This enables changes in control to be made according to further changes in motor characteristics or ambient conditions and permits the motor to move from a present to a target position in the minimum of time. Changes in motor behavior are usually gradual and the corrections of the number of acceleration steps are limited to some small value thereby avoiding radical departures. It will be noted that the control system does not force the stepping motor into a particular speed versus time pattern, but sets out a control which will minimize move time for the particular motor.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
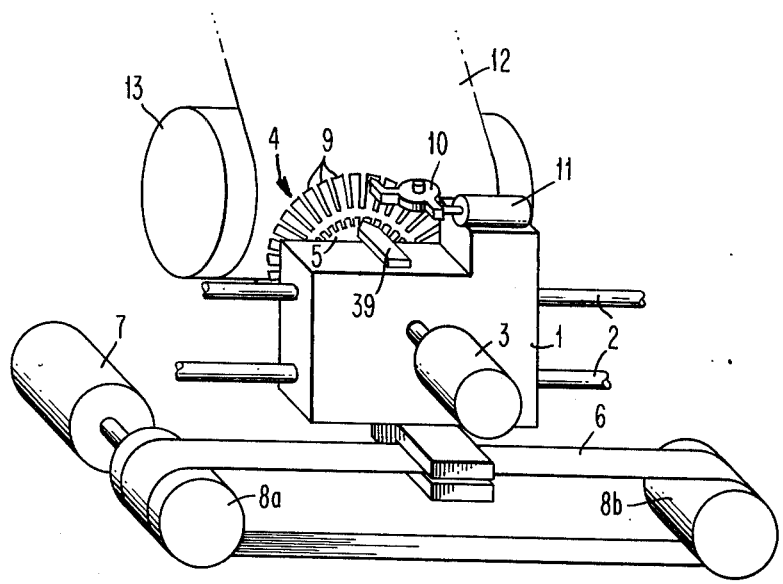
FIG. 1 is a shcematic showing of a printer apparatus in which the motor control circuit of the invention can be incorporated.

Referring to FIG. 1, there is shown a printing mechanism used as an illustrative embodiment for the stepping motor control circuits herein described. A laterally sliding carrier 1, mounted on guides 2, carries a stepping motor 3 on whose output shaft is mounted a print wheel 4 and a feedback pulse emitter disk 5. Carrier 1 is reciprocated by a toothed belt 6 driven by a second stepping motor 7 through drive pulley 8a and idler pulley 8b. Print wheel 4 comprises a disk having a number of movable type elements such as flexible spokes or fingers 9a-z, etc. Printing of any desired character is brought about by operating a print hammer 10 which may be actuated by a solenoid 11, both of which are mounted on carrier 1. When the appropriate type finger is on location, the solenoid actuates the hammer to impact the type finger and drives it into contact with the paper 12 supported on a platen 13.

Stepping motor 3 carries an emitter disk on its respective shaft that is arranged with an appropriate transducer to provide output pulses which occur in proportion to actual motor displacement. Such emitters may be either magnetic or optical devices. For example, the emitter wheel shown is that of the magnetic type in which the passing of a tooth by the tip of a permanent magnet 39 causes an output signal at the coil. In the printer shown, stepping motor 3 driving type wheel or disk 4 is rotated sufficiently to bring the desired type character into printing position and then stopped while the hammer impacts the type character. After printing, the motor is appropriately moved to the next chracter or target position. The motor is controlled to rotate the shortest distance to the next position which is never more that 180° of rotation. During printing, stepping motor 7 is continuously moving the carrier along the print line, but at a velocity which allows stepping motor 3 to properly position the print disk for the next type character.

It is highly desirable that the print disk motor position the print wheel in a minimum of time to enable a rapid print rate. The motor is controlled during each movement from a present position to a target position through first a maximum acceleration sequence of pulses, then a maximum deceleration sequence, then a constant run phase, and finally a stop sequence. The number of acceleration pulses applied to the motor for each positioning movement is assigned according to the mount of rotation required. However, power supply voltage, temperature, friction of the motor or print wheel, etc. may make the assigned number of acceleration signals insufficient or excessive.

Figure 2:
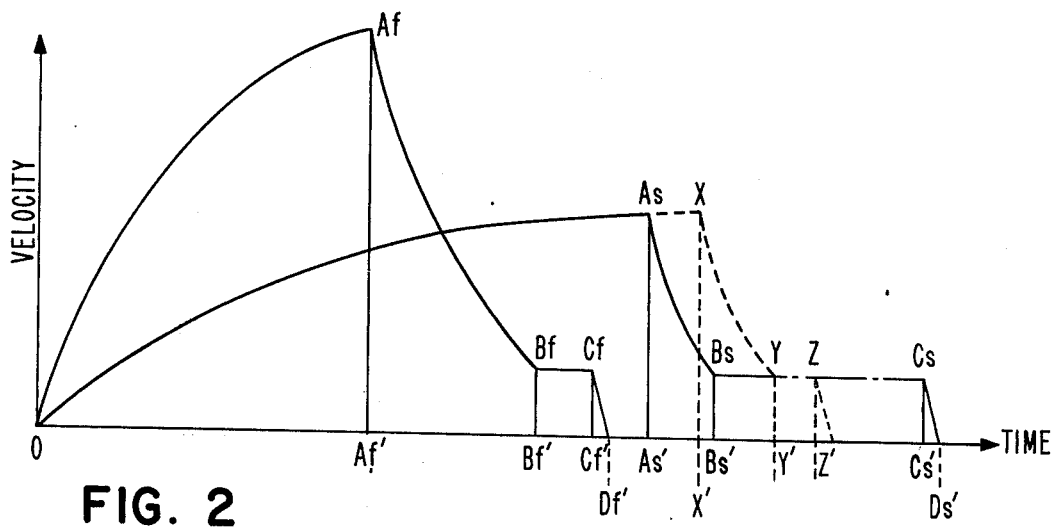
FIG. 2 is a velocity versus time diagram of the motor for a particular displacement.

In FIG. 2, there are illustrated the control and velocity characteristics for a stepping motor driving the print disk. In the velocity versus time diagram two conditions are shown in solid line: one is identified by $f$ indicating a relatavely fast acceleration and slow deceleration capabilities, as is the case with low friction prevailing; the other is identified by $s$ indicating a relatively slow acceleration and high deceleration capabilities as is the case with high friction prevailing. The curve is a plot of print disk velocity versus time. It may be assumed that the motor has to move a number of steps N in order to move the disk a designated number of character spaces on its circumference. The first phase of disk rotation consists of maximum acceleration under closed loop control for M steps, where M is a function of N, generally somewhat over N/2; this phase is represented by the curves OA in the figure.

The second phase of disk rotation consists of maximum deceleration under closed loop operation until a specified, low velocity $v$ is reached; this phase is illustrated by the curves AB. Time intervals between steps are monitored and when the interval reaches a specified value, which may be in terms of master clock pulses, deceleration ends. The third phase of disk motion consists of uniform motion at the low velocity $v$ under speed-controlled closed-loop operation until step N-2 or possibly N-1. This phase is illustrated by the portion of the curves designated BC and serves to bring the disk to the proper final position and to damp out oscillation. The fourth phase of disk rotation consists of open-loop deceleration from $v$ to zero in two steps or possibly one step in such a fashion that oscillations are avoided; this phase is illustrated by the portions of the curve designated CD.

It will be noted that branch BC can be time consuming if velocity of A is low and the deceleration is rapid as is the case identified by the index $f$. This is because the area AsBsBs'As', which represents wheel rotation during deceleration, is small. The disk thus has to move farther at the low speed $v$ in order to arrive at the desired point. In other words, the area of the curve BsCsCs'Bs' must make up for the deficiency of the area AsBsBs'As'. Under these conditions, it would be advantageous to increase M so that the switch from acceleration to deceleration occurs at X. The motion at low velocity from Y to Z thus is reduced such that the area OXYZZ' becomes equal to the area OAfBfCfCf'. The time for disk rotation is shortened because the greater portion of it occurs at high speed.

The print disk is controlled in its movement by applying to the stepping motor an assigned number M of acceleration signals that corresponds to the total number of steps required of the motor for reaching a target position. Because of the extraneous conditions encountered, and mentioned above, the number of assigned steps or signals applied for acceleration may be inappropriate. Therefore, a correction factor or number Mc of additional acceleration signals is maintained in a separate storage device and altered in accordance with actual steppng motor performance. The base number of acceleration signals required for each amount of movement is made less than the maximum number so that there is provided a wider latitude in the correction steps which may be designated Mc. For practical purposes, it is useful to break up the disk rotation into groups of character spaces. For example, for 120 character set, one may consider the spaces as divided into seven groups: group 1 might be for character spaces between zero and six spaces from the present position of the disk; group 2 might include movement from seven to 12 spaces; group 3 13 to 20 spaces; group 4 21 to 30 spaces and so on with a group designated for each ten character spaces thereafter. Group 1 with movement of six spaces or less in either direction from the present position would however require no correction since in that case the disk is always positioned faster than the carrier can move from one printing position to the next. Although the correction of M can always be calculated from the actual value of the distance from Bs to Cs in FIG. 2, control is simplified by specifying that the correction calculated for any single cycle of operation is either zero, plus one or minus one.

Figure 3:
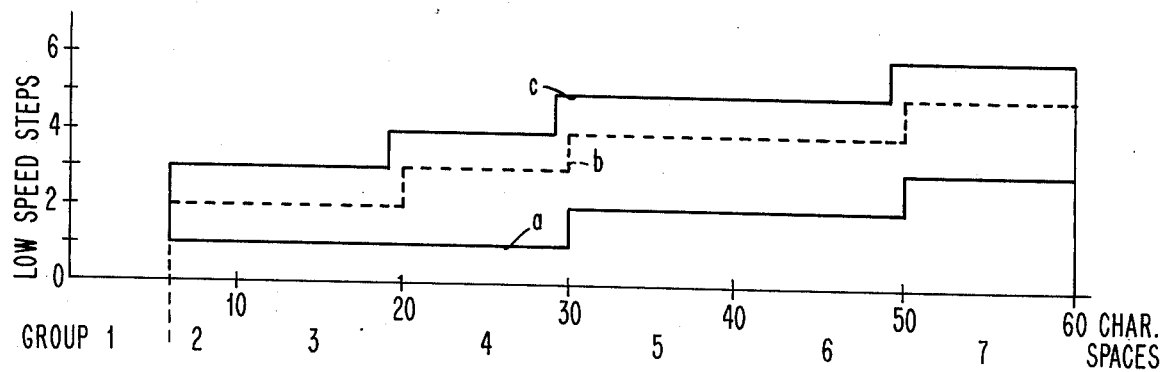
FIG. 3 is a diagram of low speed motor displacement versus magnitude of displacement command when a stepping motor is in the low velocity range preceding a stop command.

FIG. 3 is an illustration of the number of motor advance steps required after reaching the low velocity from which the motor can be stopped when entering the stop phase. The figure is a plot of number of low speed steps versus the specified group designations or character spaces required for a motor movement. The lower solid line curve $a$ defines the limit of low-speed motor advance steps required for settle out to the stopping velocity. Dotted line curve $b$ defines the multiplier effect and scatter in reaching the required low velocity. The multiplier effect results in certain cases when an added correction acceleration signal may require an additional deceleration signal to arrive at the low velocity. The proper correction Mc may be defined by the following conditions: if the number of steps at the low velocity is fewer than the number defined by the curve $a$ for each group of character spaces, then the correction should be made to decrease the number of acceleration pulses applied or, in other words, be made a minus one; if the number of motor steps at the low velocity is greater than solid line curve $c$, then the correction of acceleration signals should be adjusted by a plus one; for steps at low velocity between curves $a$ and $c$, no change should be made in the number of acceleration signals applied to advance the motor.

Figure 4:
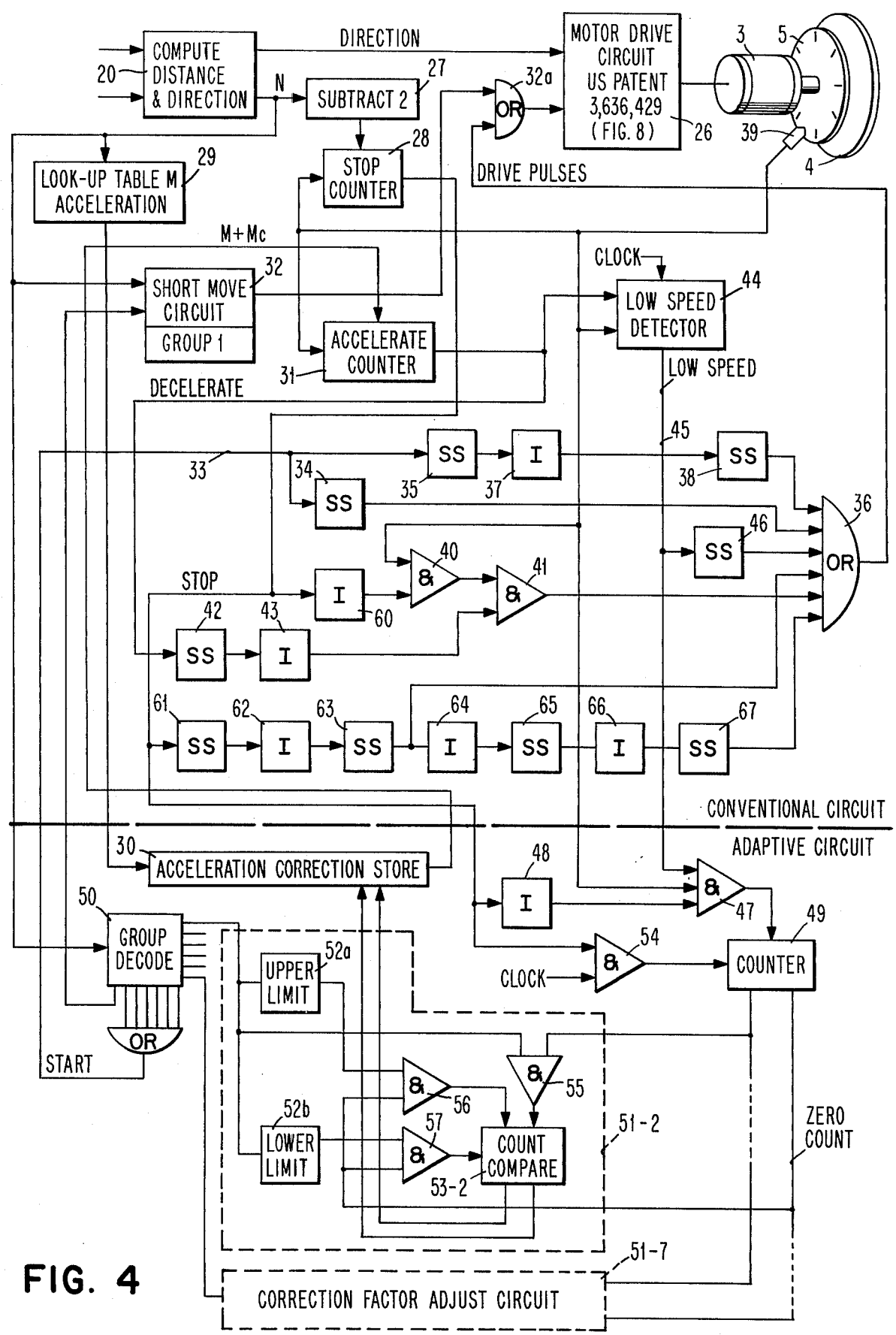
FIG. 4 is a schematic logic diagram of a stepping motor control circuit incorporating adaptive logic in accordance with the invention.

One manner in which a stepping motor control circuit can be rendered adaptive to changes in operating conditions is shown in FIG. 4. The circuit portion above the heavy broken line is that required for motor control of the fixed operating data, while the circuit portion below the broken line is the adaptive portion that senses motor behavior and alters the fixed data accordingly. When the print disk is to be moved, its present position and new position, represented by unique binary identification numbers, are supplied to a compute move distance and direction circuit 20. This circuit determines the number of motor steps and the direction of motor rotation to reach the new target position.

Figure 5:
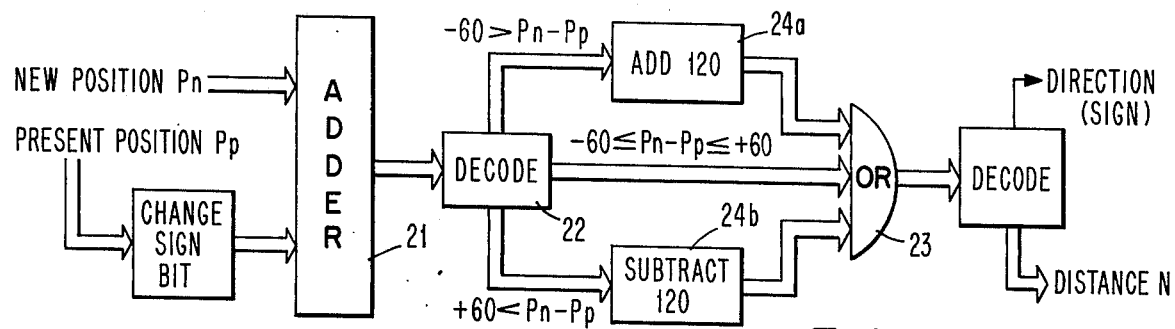
FIG. 5 is an example of a logic circuit with which stepping motor displacement direction and distance can be determined from input data.

Such circuits are known, and an example is shown in FIG. 5. Briefly, the present and new disk positions Pp and Pn are combined in an adder 21 with the sign of Pp having been changed before adding. The sign indicates the direction of the position from a home station. The change of sign permits the use of simpler adder circuits to accomplish the subtraction. Assuming that a print wheel has 120 characters, it is desired that the motor rotates the print disk the shortest distance to the next character to be printed. After addition of Pp and Pn, the sum is sent to decode circuit 22 to determine the amount of print disk movement and direction. If the difference is between −60 steps and +60 steps, then the sign and magnitude of the new move are transmitted directly through a multichannel cable to OR 23. If the difference is less than a −60, then the difference has added thereto 120 units or the number of steps in a full revolution to make the resultant move in the opposite direction less than one-half of a revolution. The output from add circuit 24a is then applied through OR 23. Similarly, if decode circuit 22 detects that the difference is greater than a +60, then that difference has subtracted from it 120 units at circuit 24b thereby selecting the shortest distance to the new position. This result is applied through OR 23 to decode circuit 25 to provide output signals of direction and distance.

Referring again to FIG. 4, the number of steps and direction sign which may be assumed positive for clockwise and negative for counterclockwise direction are supplied from compute circuit 20. The direction command is supplied directly to motor drive and switching circuit 26 which may, for example, be like FIG. 8 of U.S. Pat. 3,636,429. The number N of steps required for movement to the new position is supplied first to a subtract circuit 27 in which N is reduced by two and that result stored in counter 28. The total number of steps N is also applied to look-up table 29 from which is extracted the number M of acceleration steps corresponding to the particular number of advance steps N. The look-up table, which is well known in the data processing field, contains the corresponding number M of acceleration steps which is normally peculiar to the input N. When table 29 is addressed, its output of value M causes addressing of an acceleration correction value store 30 containing the number of acceleration steps Mc which are added to the output value from table 29. At this point, it may be assumed that store 30 contains a correction value Mc which is added to the value M. When values for M are stored in table 29 initially, they are preferably made to be smaller than that actually required. This will simplify the circuits required in store 30 by insuring that all values in that store are positive. The acceleration value M with Mc added thereto is stored in counter 31.

Stepping motor 3 is initially started by a move signal, not shown, initiated at the time the new disk location is transmitted to circuit 20. When new data to be printed arrives at circuit 20, this circuit determines the move distance and direction. The distance information is supplied to circuit 50, where an OR gate generates a start signal if N is in groups 2 to 7. This signal appears on start line 33 and initiates operation of two single shot circuits 34 and 35. The signal from single shot 34 is transmitted through OR 36 to motor drive circuit 26 as an advance pulse. As single shot 35 times out, its output through inverter 37 serves to initiate operation of single shot 38 which provides an additional insert pulse through OR 36 to motor drive 26. Thus upon provision of a single start signal both a start pulse and insert or acceleration pulse are provided.

If N falls into group 1, the adaptive circuitry is not needed and the conventional short-move routine is followed. This is shown at shot move circuit 32 whose output is activated when a group 1 signal from decode circuit 50 and distance signal N from compute circuit 20 occur concurrently. The start output is applied through OR 32a to drive circuit 26.

As mentioned above, an emitter disk 5 is secured on the motor shaft along with the print disk 4. The emitter disk is constructed so that during its rotation with the motor adjacent a transducer 39, an output pulse is generated corresponding to each motor step. As the motor is moved by the start and insert pulses, it provides input signals to both counters 28 and 31 causing the counters to decrement toward zero as the motor is rotated. These feedback pulses are also used to control the continued application of advance pulses to the motor and are supplied as one input to AND 40. The second input to AND 40 is an inverted stop signal from inverter 60 so that during the time counter 28 is not at zero, a stop signal is absent and AND 40 is fully gated to transmit feedback pulses. Pulses from AND 40 are supplied to AND 41 which is gated by the absence of a deceleration signal. Such deceleration signal from counter 31 is not generated until counter 31 is decremented to zero at the end of the specified number of acceleration pulses M + Mc. With the deceleration control signal absent at single shot 42, the output from inverter 43 is proper to gate the feedback pulses through AND 41 to OR 36 and hence to drive circuit 26. When the specified number of acceleration pulses M + Mc has been reached, indicated by counter 31 decrementing to zero, a deceleration signal is generated and applied at single shot 42. The single shot is timed to provide an output pulse having a duration sufficient to block two feedback pulses through inverter 43 which blocks AND 41. By blocking two feedback pulses, the phase angle of the applied step motor pulses is altered so that succeeding feedback pulses, after single shot 42 has timed out, will serve to slow the motor. Although a single shot 42 has been shown as the suppression circuit for two feedback pulses, alternative circuits such as triggers may be used to more accurately suppress the necessary feedback pulses. Successive feedback pulses will continue to decelerate the motor because of the change in the phase angle when applied to the motor and these pulses will continue to decrement counter 28.

When counter 31 provided the deceleration signal, that signal was also applied to a low speed detector circuit 44 which monitors the motor velocity during the deceleration period to sense the time that the motor arrives at a predetermined low velocity. This velocity is detected by using the deceleration signal at detector 44 to gate continuously supplied clock pulses which increment a counter starting from zero. Each feedback pulse from transducer 39 resets the counter to zero. The count of clock pulses thus is a measure of the time between successive feedback pulses. By fixing the limit of the counter to some predetermined value, a low speed output signal on line 45 will be generated when the feedback pulses become too infrequent. The low speed signal is applied to a single shot 46 which serves to inject a pulse at the predetermined low velocity to again change the phase angle for feedback pulse application thereby causing the stepping motor to run at constant velocity until counter 28 reaches zero to issue a stop signal. Detector 44 can be adjustable to achieve a desired low velocity just prior to the issuance of stop signals.

The low speed signal on line 45 is used to control the adaptive circuitry below the broken line in FIG. 4. The signal on line 45 is applied as a gating signal to AND 47. A second gating signal is the absence of a stop signal from counter 28 which is indicated by the output of inverter 48. The control input for AND 47 is the feedback signal from emitter 39 which produces an output pulse from AND 47 during each feedback pulse issued during the low velocity phase of the motor. These pulses are accumulated in the counter 49 until AND 47 is blocked by the occurrence of a stop signal at inverter 48. The total accumulated in counter 49 will be one of the values illustrated earlier in FIG. 3 for the several groups into which a particular motor advancement falls. The occurrence of a stop signal from counter 28 at AND 54 gates clock pulses into counter 49 to decrement the counter for read out into AND 55 of one of several count compare circuits 53-2 through 53-7. The count compare circuit gate is that corresponding to the group signal of decode circuit 50 currently energized.

Recalling the above description with regard to compute block 20 of FIG. 4, when the number N of necessary advance steps for the motor was determined, that value was transmitted to a decoding circuit 50 to determine in which group the particular N value fell. Upon decoding that value, one of the group adjustment circuits 51-2 through 51-7, shown in the closed, dotted line, is energized to provide an upper and lower limit at circuits 52a and 52b. These circuits each produce the limits outside of which a correction is necessary and between which no correction is necessary in the number of acceleration pulses. After counter 49 has been decremented to zero and transferred its count into count-compare 53-2, counter 49 issues a zero count signal that is applied to ANDs 56 and 57 which gate in the upper and lower limits from circuits 52a and 52b so that comparison is made according to the limits of FIG. 3. An appropriate adjustment of either a plus one or minus one is made to the correction value for acceleration signals in store 30 of FIG. 4, described hereinafter with reference to FIG. 6. This new value will be used during the next advance command for the stepping motor when N again falls into the group number just corrected. Corrections are made in store 30 in single increments in order to avoid overcorrection for changes in motor characteristics or loads, and to simplify the circuits.

Returning now to the motor control circuit of FIG. 4, when sufficient feedback pulses from transducer 39 have decremented counter 28 to zero, a stop command is issued which blocks AND 47 through inverter 48 and also ANd 40 through inverter 60. The generation of a stop pulse further initiates a pulse from single shot 61 which provides a first timed delay to change the phase angle of the motor control pulse, and when timed out is effective through inverter 62 to initiate a stop pulse at single shot 63. This pulse is applied through OR 36 to the motor drive circuit 26. The pulse from single shot 63 is also inverted at inverter 64 which initiates a second stopping delay at single shot 65. The latter pulse is effective after time out through inverter 66 to initiate single shot 67 which produces the final motor drive pulse detenting the motor in the desired position.

Figure 6:
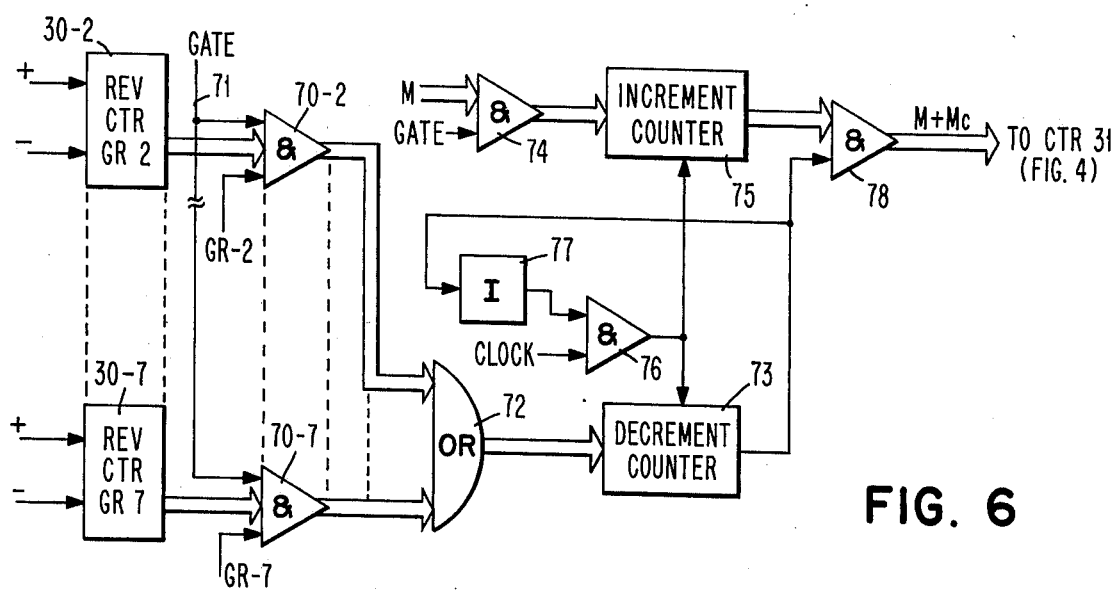
FIG. 6 is a schematic logic diagram of a storage and adder circuit which may be used in the adaptive circuit of the invention to alter motor control data in accordance with motor performance.

A circuit that may be used for storing the corrected value of acceleration signals that are to be added to the base number of acceleration signals is shown in more detail in FIG. 6. Correction store 30 contains a plurality of reversible counters 30-2 through 30-7, one for each group of motor steps. The counters are altered by activating either the plus or minus input lines to increment or decrement the appropriate counter according to the compare signal from compare circuit 53 for that group. When a command is given the stepping motor to move to a new target position, the number N of the steps to be moved activates one of the group output lines from decoder 50 (FIG. 4) and conditions one of the respective ANDs 70-2 through 70-7. Upon the occurrence of a timing gate signal on line 71, the desired AND will be fully conditioned and the correction count Mc from its respective group counter will be transmitted through that AND OR circuit 72 to load a decrementing counter 73. The base value of M is gated through AND 74 to load an incrementing counter 75. AND 76 has as one input a continuously running clock and as a gating input the inverted signal of the output of decrementing counter 73. As long as counter 73 is not at zero, AND 76 is gated and clock pulses are applied to both counters 73 and 75. When counter 73 reaches zero, the output signal provides a blocking signal to AND 76 through inverter 77 and is a conditioning signal to AND 78. The base number of acceleration pulses M loaded into counter 76 thus has added thereto the count transferred to counter 73 so that the input through AND 75 equals M plus Mc. This sum is then entered in decrementing accelerate counter 31 of FIG. 4.

While the invention has been particularly shown and described with reference to a preferred embodiment thereof, it will be understood by those skilled in the art that various changes in form and details may be made therein without departing from the spirit and scope of the invention.

What is claimed is:

1. An adaptive control system for a stepper motor driving a load to a target position, comprising:
   means for generating advance signals representative of the number of advance increments required for said motor to reach said target position;
   storage means responsive to said advance signals for indicating the number of acceleration increments for said motor corresponding to said number of advance signals;
   means responsive to said storage indications for sequentially applying advance signals to said motor according to said number of acceleration increments;
   means on said motor for generating output signals proportional to displacement thereof;
   means activated by the termination of said acceleration signals for applying deceleration signals to slow said motor to a predetermined speed;
   means responsive to said advance increments and said output signals for applying stop signals to said motor;
   means for counting displacement signals of said motor at said predetermined speed until the occurrence of said stop signal;
   means operable at the conclusion of said counting for comparing said displacement signal count with predetermined values; and
   means responsive to said comparison means for altering the number of said acceleration signal corresponding with said number of advance increments in said storage means.

2. Apparatus as described in claim 1 wherein said means for counting is enabled during operation of said motor at said predetermined speed.

3. Apparatus as described in claim 1 wherein said means for sequentially applying said acceleration signals is operable in response to said output signals of said motor.

4. An adaptive control system for a stepping motor driving a load to a target position, comprising:
   storage means for indicating the number of acceleration steps for advancing said motor for a predetermined displacement from a present position to a target position;
   means responsive to said indicating means for applying acceleration signals to said motor in accordance with said acceleration steps, and thereafter applying signals to slow said motor to a stop at said target position;
   means for initiating a stop signal for said motor;
   means responsive to said slowing of said motor for counting units of displacement occurring after said motor reaches a predetermined velocity until the occurrence of said stop signal; and
   means for comparing said units of motor displacement with a pair of preselected values and altering said number of acceleration steps when said displacement units are outside the range defined by said values.

5. Apparatus as described in claim 4 wherein the number of acceleration signals is decreased when said displacement units are below said range, and the number of said acceleration signals are increased when said displacement units are greater than said range.

6. An adaptive control system for a stepping motor during movement from a present position to a target position, comprising:
   storage means for indicating the number of steps for an accelerating portion of an assigned motor movement;
   means responsive to said indicating means for applying primary drive signals to accelerate said motor in accordance with said number of said acceleration steps;
   means responsive to termination of said primary drive signals for applying secondary signals to move said motor through a stopping portion of said motor movement;
   means operable during said stopping portion for measuring the displacement of said motor while at a predetermined velocity; and
   means for comparing said displacement at said predetermined velocity with preselected values and either increasingly or decreasingly altering in said storage means said number of steps in said accelerating portion when said displacement differs from said preselected values.

7. Apparatus as described in claim 6 wherein said storage means includes means for storing a base number of steps in said accelerating portion and a supplemental correction number of steps, and means for combining said base number with said supplemental number.

8. Apparatus as described in claim 6 wherein said measuring means includes means for accumulating units of motor displacement, and means operable at a predetermined velocity of said motor for enabling said accumulation means.

9. Apparatus as described in cliam 6 wherein said comparing means includes means for establishing a range of values outside of which the quantity in said accumulating means will produce a change in said supplemental correction value of said storage means.

10. Apparatus as described in claim 6 wherein the correction value of said acceleration steps is stored in groups corresponding to differing magnitudes of said assigned motor movement.

* * * * *